(12) United States Patent
Franceschi et al.

(10) Patent No.: US 7,654,347 B2
(45) Date of Patent: Feb. 2, 2010

(54) CRAWLER MOVING SYSTEM HAVING VARIABLE CONFIGURATION

(75) Inventors: Giuliano Franceschi, La Spezia (IT); Alessandro Lunadei, Leghorn (IT); Carlo Felice Bellotti, La Spezia (IT)

(73) Assignee: Oto Melara S.p.A., La Spezia (IT)

( * ) Notice: Subject to any disclaimer, the term of this patent is extended or adjusted under 35 U.S.C. 154(b) by 324 days.

(21) Appl. No.: 11/639,755

(22) Filed: Dec. 15, 2006

(65) Prior Publication Data
US 2007/0137902 A1    Jun. 21, 2007

(30) Foreign Application Priority Data
Dec. 19, 2005    (IT) .......................... MI2005A2414

(51) Int. Cl.
*B62D 55/116*    (2006.01)
(52) U.S. Cl. .................................................. 180/9.32
(58) Field of Classification Search ............... 180/9.1, 180/9.32, 9.5, 9.52
See application file for complete search history.

(56) References Cited

U.S. PATENT DOCUMENTS

| | | | | |
|---|---|---|---|---|
| 3,166,138 A | * | 1/1965 | Dunn, Jr. ................... | 180/9.23 |
| 3,288,234 A | * | 11/1966 | Feliz .......................... | 180/6.5 |
| 4,194,584 A | * | 3/1980 | Kress et al. ................. | 180/9.23 |
| 4,483,407 A | * | 11/1984 | Iwamoto et al. ............. | 180/9.5 |
| 4,932,831 A | | 6/1990 | White | |
| 5,395,129 A | * | 3/1995 | Kao .......................... | 280/5.22 |
| 6,132,287 A | * | 10/2000 | Kuralt et al. ................ | 446/433 |
| 7,316,405 B2 | * | 1/2008 | Kritman et al. ............ | 280/5.22 |
| 7,475,745 B1 | * | 1/2009 | DeRoos ..................... | 180/9.34 |
| 2003/0183428 A1 | * | 10/2003 | Hedeen ..................... | 180/9.32 |

FOREIGN PATENT DOCUMENTS

DE    968 705 C    3/1958
WO    WO 2005/105388 A    11/2005

OTHER PUBLICATIONS

European Search Report, Aug. 6, 2007.

* cited by examiner

*Primary Examiner*—Kevin Hurley
(74) *Attorney, Agent, or Firm*—James V. Costigan; Hedman & Costigan P.C.

(57) ABSTRACT

Crawler moving system with variable configuration comprising a front axle (6), a rear axle (2) and at least one central axle (4) suitable for transmitting movement to the others through at least one crawler per side.

Between the front axle and the central axle and between the rear axle and the central axle respective intermediate axles (3,5) are foreseen that act as a pivot about which such front and rear axles are able to rotate.

6 Claims, 1 Drawing Sheet

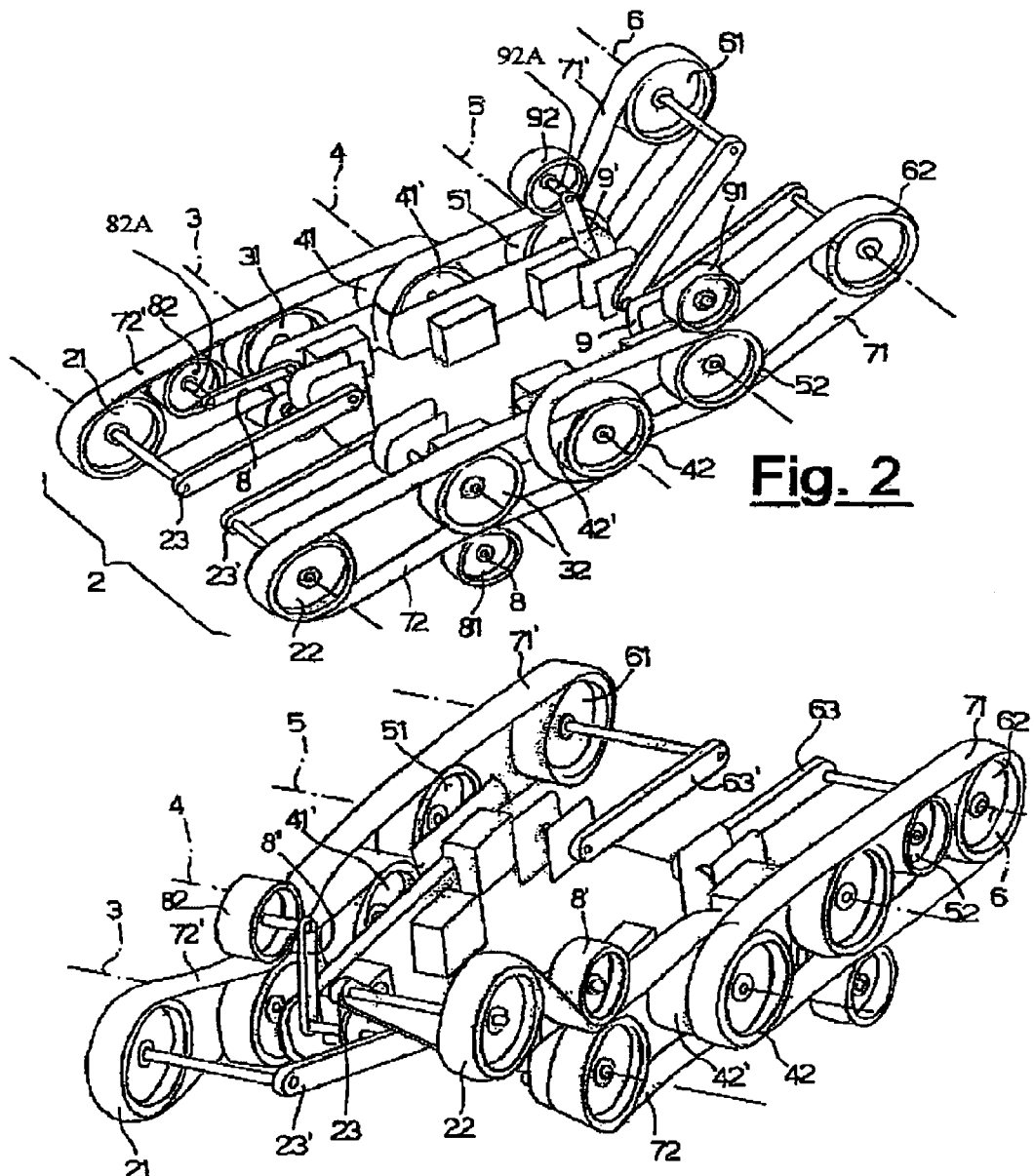

CRAWLER MOVING SYSTEM HAVING VARIABLE CONFIGURATION

The present invention concerns a crawler moving system with variable configuration.

In particular, the present invention refers to a crawler moving system with variable configuration suitable for moving vehicles ensuring that it is able to ride over obstacles, climb slopes and nimbly climb staircases.

In the state of the art crawler moving systems are known comprising a plurality of pairs of wheels that form as many axles of the vehicle, about which a crawler extends (on each side of the axle) suitable for allowing the axles to make contact with the ground. At least one of such axles is motorised and makes the crawler and the vehicle as a whole move.

In order to make the movement of vehicles with crawlers more flexible, for example in the case in which such vehicles must go over slopes or obstacles, some vehicles have a mobile arm moved by a hydraulic piston capable of holding onto such obstacles and allowing the vehicle to climb and pass the obstacle itself.

The Applicant has observed that in order to make it easier to pass over obstacles it is possible to move the first front or rear axle of the crawler system, so that it can be lifted with respect to the others on which the vehicle is rested. In order to make at least one axle of the crawler system mobile and at the same time ensure that the crawlers stay in contact with all of the wheels the Applicant has added at least one pair of wheels to the crawler system that acts as takeup pulley, arranged in a position corresponding to the axis about which the mobile axle moves.

An aspect of the present invention concerns a crawler moving system with variable configuration comprising a front axle, a rear axle and at least one central axle suitable for transmitting movement to the others through at least one crawler per side, characterised in that it comprises between the front axle and the central axle and between the rear axle and the central axle respective intermediate axles that act as a pivot about which such front and rear axles are able to rotate, a front and rear bumper axle, in which each of the wheels of the axle is positioned in contact with the wheels of the intermediate axles, so as to keep the crawlers in contact with such intermediate wheels during such a rotation of the front and rear axle.

The characteristics and advantages of the system according to the present invention shall become clearer from the following description, given as a non-limiting example, of an embodiment of the invention with reference to the attached figures in which:

FIG. 1 represents a schematic view of the crawler system with the front axle in raised position according to the present invention;

FIG. 2 represents a schematic view of the crawler system with the rear axle in raised position according to the present invention.

The crawler system according to the present invention is made through suitable linkages that allow the geometry of the carrelage to be varied increasing the possibility of the vehicle to pass over obstacles, climb slopes and nimbly climb staircases.

The system comprises a plurality of rotating axles having at least one wheel with which a respective crawler is associated on each side of the axle. In particular, the system comprises at least one front axle, a rear axle and a central axle that is suitable for transmitting movement to the others through at least one crawler per side.

According to the present invention the front axle and the rear axle can lift up and lower down with respect to the advancing plane of the vehicle on which the crawler system is mounted. For this purpose, between the front axle and the central axle and between the rear axle and the central axle there are respective intermediate axles that act as a pivot about which such front and rear axles rotate.

In order to keep the crawlers in contact with such intermediate axles during the movement of the front and rear axles, the system according to the present invention has a front and rear bumper axle, in which each of the wheels of the axle is positioned in contact with the wheels of the intermediate axles so as to keep the crawlers in contact with such intermediate wheels. In particular, with reference to the example embodiment illustrated in FIGS. 1 and 2, the system comprises five axles: a rear axle 2, a rear intermediate axle 3, a central axle 4, a front intermediate axle 5 and a front axle 6. On opposite sides of such intermediate and front and rear axles each of such axles, at least one wheel 21 and 22, 31 and 32, 51 and 52, 61 and 62 is foreseen, whereas the central axle 4 foresees the presence of a first pair of wheels 41 and 41' on one side and a second pair of wheels 42 and 42' on the other side.

A first pair of crawlers 71 and 71' is associated with such central, front and front intermediate axles (one for each side of the axle) and a second pair of crawlers 72 and 72' is associated with the rear, intermediate rear and central axles.

Preferably, the motion is transmitted to the crawlers through such a central axle through the pair of coaxial wheels 41 and 41' and 42 and 42' suitable for transmitting the movement to both of the crawlers.

The front axle 6 and the rear axle 2 are fixed to respective rods (one for each wheel) 23 and 23', 63 and 63' which respectively rotate about the intermediate front axle and intermediate rear axle, so as to allow the wheels of such axles to lift up and lower down with respect to an advancing axis of the vehicle brought about by the central axle and by the intermediate axles.

In order to keep the crawlers in contact with such intermediate axles during the movement of the front and rear axles, the system according to the present invention has at least one rear bumper axle 82A formed from a first pair of connecting rods 8 and 8' suitable for supporting a pair of wheels 81 and 82 that can be moved, so as to allow such wheels to be positioned in contact with the wheels of the intermediate rear axle and to keep the crawlers in contact with such intermediate wheels.

Similarly, in the front portion of the vehicle the crawler system has a front bumper axle 92A formed from a second pair of connecting rods 9 and 9' suitable for supporting a pair of wheels 91 and 92 that can be moved, so as to allow such wheels to be positioned in contact with the wheels of the intermediate rear axle and to keep the crawlers in contact with such intermediate wheels.

Preferably, such wheels 81, 82 and 91, 92 can be positioned in contact with such intermediate wheels on opposite sides, so that the rods 23 and 23' and 63, 63' can both rotate in the clockwise and anti-clockwise direction with respect to the advancing axis of the vehicle. In this way the vehicle is able to pass over obstacles both "uphill" and "downhill", i.e. to work both on the upper surface and on the lower surface of the crawlers.

Moreover, in the case in which the crawlers are in horizontal position, the wheels 81, 82, 91 and 92 are housed in the shape of the crawler: this avoids increasing the overall friction of the carrelage and the risks of damaging the mechanism due to accidental bumps during the movement of the platform.

Such connecting rods are advantageously actuated through dedicated actuators, for example electrical stepper motors and electromagnetic devices. Similarly, the movement of the rods 23 and 23' and 63 and 63' can be carried out through electrical motors directly associated with the front and rear intermediate axles.

The invention claimed is:

1. Crawler moving system with variable configuration comprising a front axle (6), a rear axle (2) and at least one central axle (4) where each axle has a wheel and said wheel is connected to at least one other wheel with a crawler, said crawler being adapted for transmitting movement to the wheels and having at least one crawler per side, wherein said crawler moving system comprises between the front axle and the central axle and between the rear axle and the central axle respective intermediate axles (3,5) that act as a pivot about which said front and rear axles are able to rotate, front and rear bumper axles, each having a wheel (81,82,91,92) which is positioned in contact with the crawlers that connect wheels of the intermediate axles, so as to keep the crawlers in contact with said intermediate wheels when the front and rear axle wheels are rotated and having a first pair of crawlers (71,71') associated with central (4), front (6) and front intermediate (5) axles, and having a second pair of crawlers (72,72') is associated with the rear (2), intermediate rear axle (3) and central (4) axles whereby motion is transmitted from such a central axle through a pair of coaxial wheels (41,41',42,42') suitable for transmitting the movement to both of the crawlers.

2. System according to claim 1, in which such a rear and front axle (2,6) are fixed to respective rods (23,23',63, and 63'), one for each wheel, which respectively rotate about an intermediate front axle and intermediate rear axle, so as to allow the wheels of said axles to lift up and lower down with respect to an advancing axis of the vehicle.

3. System according to claim 1, in which said bumper axles each comprise a pair of connecting rods (8,8',9,9') suitable for supporting such pairs of wheels (81,82,91,92).

4. System according to claim 1, in which said wheels (81,82,91,92) of the bumper axles can be positioned in contact with such intermediate wheels on opposite sides, so that rods (23,23',63,63') can both rotate in the clockwise and anti-clockwise direction with respect to the advancing axis of the vehicle.

5. System according to claim 3, in which said connecting rods are actuated through dedicated actuators, electrical stepper motors and/or electromagnetic devices.

6. System according to claim 1, in which the movement of the rods is carried out through electrical motors directly associated with the front and rear intermediate axles.

* * * * *